(12) United States Patent
Romanenko et al.

(10) Patent No.: US 10,878,087 B2
(45) Date of Patent: Dec. 29, 2020

(54) SYSTEM AND METHOD FOR DETECTING MALICIOUS FILES USING TWO-STAGE FILE CLASSIFICATION

(71) Applicant: AO Kaspersky Lab, Moscow (RU)

(72) Inventors: Alexey M. Romanenko, Moscow (RU); Alexander V. Liskin, Moscow (RU); Sergey V. Prokudin, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 254 days.

(21) Appl. No.: 16/184,249

(22) Filed: Nov. 8, 2018

(65) Prior Publication Data

US 2020/0004956 A1  Jan. 2, 2020

(30) Foreign Application Priority Data

Jun. 29, 2018 (RU) ................................ 2018123697

(51) Int. Cl.
*H04L 29/06* (2006.01)
*G06F 21/55* (2013.01)
*G06N 99/00* (2019.01)
*G06N 20/00* (2019.01)

(52) U.S. Cl.
CPC .......... *G06F 21/552* (2013.01); *G06N 20/00* (2019.01); *G06F 2221/034* (2013.01)

(58) Field of Classification Search
CPC ................ G06F 21/564; G06F 21/552; G06F 2221/034; G06N 20/00; G06N 20/20; G06N 3/0454; G06N 5/003
See application file for complete search history.

(56) References Cited

U.S. PATENT DOCUMENTS

| | | | |
|---|---|---|---|
| 6,023,706 A * | 2/2000 | Schmuck | G06F 16/1858 |
| 8,769,683 B1 | 7/2014 | Oliver | |
| 9,251,114 B1 * | 2/2016 | Ancin | H04L 63/08 |
| 9,940,459 B1 | 4/2018 | Saxe | |
| 10,546,123 B1 * | 1/2020 | Lan | G06F 21/56 |
| 2011/0162070 A1 * | 6/2011 | Krasser | G06F 21/564 |
| | | | 726/23 |
| 2012/0174227 A1 | 7/2012 | Mashevsky et al. | |
| 2013/0111591 A1 | 5/2013 | Topan et al. | |
| 2015/0007319 A1 | 1/2015 | Antonov et al. | |
| 2015/0101049 A1 | 4/2015 | Lukacs et al. | |

(Continued)

FOREIGN PATENT DOCUMENTS

EP  2819054 A1  12/2014

*Primary Examiner* — Mohammad A Siddiqi
(74) *Attorney, Agent, or Firm* — Arent Fox LLP; Michael Fainberg (57) ABSTRACT

Disclosed herein are methods and systems for detecting malicious files using two stage file classification. An exemplary method comprises selecting, by a hardware processor, a set of attributes of a file under analysis, calculating, by the hardware processor, a hash of the file based on the selected set of attributes, selecting, by the hardware processor, a classifier for the file from a set of classifiers based on the calculated hash of the file, assigning, by the hardware processor, the file under analysis to the one or more categories based on the selected classifier, determining whether the file has been assigned to a category of malicious files and concluding that the file is malicious based on the determination.

18 Claims, 5 Drawing Sheets

(56) References Cited

U.S. PATENT DOCUMENTS

| | | | |
|---|---|---|---|
| 2016/0099963 A1* | 4/2016 | Mahaffey | H04L 63/0227 |
| | | | 726/25 |
| 2017/0093893 A1* | 3/2017 | Davydov | H04L 63/1425 |
| 2017/0193229 A1* | 7/2017 | RoyChowdhury | G06F 21/564 |
| 2018/0101682 A1 | 4/2018 | Krukov et al. | |
| 2018/0198800 A1* | 7/2018 | Krasser | G06F 21/56 |
| 2018/0234434 A1* | 8/2018 | Viljoen | H04L 63/145 |

* cited by examiner

SYSTEM AND METHOD FOR DETECTING MALICIOUS FILES USING TWO-STAGE FILE CLASSIFICATION

CROSS-REFERENCE TO RELATED APPLICATIONS

This application claims benefit of priority under 35 U.S.C. 119(a)-(d) to a Russian Patent Application No. 2018123697 filed on Jun. 29, 2018, the contents of which is herein incorporated by reference in its entirety.

FIELD OF TECHNOLOGY

The disclosure generally relate to the field of classification of files, and more specifically to systems and methods for detecting malicious files using two-stage file classification.

BACKGROUND

In the present day, computing devices—smartphones, computers, tablets, and so forth—have become an essential attribute of almost every individual. With the help of such devices, people perform a multitude of everyday tasks: from communicating by email to paying for purchases in stores. The widespread use of such devices motivates criminals to create malicious programs—programs designed especially for unlawful access to a user's data, and also to the resources of computing devices as a whole.

At present, antivirus applications are widely used to contend with malicious programs. These are programs designed to detect malicious programs and protect computing devices against those malicious programs. Various approaches and technologies are used to afford such protection: signature analysis, behavioral analysis, heuristic rules, and so on. But as antivirus technologies develop, the criminals are also perfecting ways of getting around these protection mechanisms. Thus, the development of antivirus technologies is always an ongoing task, whose goal is to increase the quality of detection of malicious programs and to lower the errors of the first and second kind in the detection of malicious programs.

To increase the quality of detection of malicious programs, classifying models obtained as a result of machine learning are being used ever more frequently. Such models pick out every possible attribute (information about the compilers used to create the applications, information about the sizes of the files being executed, sets of machine instructions, and so forth) from the applications being analyzed, particularly executable files (such as PE files), and on the basis of these candidate classifiers attributes they assign the application being analyzed to one of the classes of applications; accordingly, the detection of a malicious application occurs when the application being analyzed is assigned to the class of malicious applications. However, even such methods of detection of malicious applications require continual improvement in order to provide protection for the computing devices of a user. Simple classifying models are also being replaced by more complex ones, such as two-stage models. Yet these models have their drawbacks: the rough classification classifies the analyzed files in very superficial manner and fails to consider whether files of the same class are similar. Aspects of the present disclosure are addressed to overcoming the deficiencies of the existing approaches and to enhance the quality of detection of malicious programs even further.

SUMMARY

The present disclosure is intended for detecting malicious files using two-stage file classification.

In one exemplary aspect, an exemplary method for detecting malicious files using two-stage file classification comprises: selecting, by a hardware processor, a set of attributes of a file under analysis, calculating, by the hardware processor, a hash of the file based on the selected set of attributes, selecting, by the hardware processor, a classifier for the file from a set of classifiers based on the calculated hash of the file, assigning, by the hardware processor, the file under analysis to the one or more categories based on the selected classifier, determining whether the file has been assigned to a category of malicious files and concluding that the file is malicious based on the determination.

In another exemplary aspect, the set of attributes are simple attributes whose identification does not consume computing expenses greater than a predetermined threshold, or both simple attributes and complex attributes whose computing expenses exceed the predetermined threshold.

In another exemplary aspect, the simple attributes comprise attributes of a header of the file, identifies of objects described in the header, size of the objects, and the order of the objects in the file.

In another exemplary aspect, the hash is a flexible hash having a similar value for two similar files, wherein files are considered similar when the degree of similarity is greater than a predetermined threshold value.

In another exemplary aspect, the one or more categories comprise malicious files, trusted files and untrusted files.

In another exemplary aspect, the method further comprises assigning a hash value for each classifier in the set of classifiers, prior to selecting the classifier.

In another exemplary aspect, the method further comprises selecting a plurality of teaching files for supervised teaching of a classifying model to generate a plurality of candidate classifiers, wherein the plurality of teaching files corresponds to a known flexible hash in the set of classifiers, and there is a known flexible hash for each of the one or more categories, verifying each of the plurality of candidate classifiers by classifying a plurality of verification files, including at least the plurality of teaching files, selecting a classifier from the plurality of candidate classifiers, wherein the selected classifier resulted in the least false categorizations of the plurality of verification files and assigning the classifier to the known flexible hash, for each of the one or more categories.

In another exemplary aspect, the method further comprises calculating a coefficient of false positives based on known categorizations of the plurality of verification files to aid in the selecting of the classifier.

In another exemplary aspect, the method further comprises selecting the classifier with the smallest coefficient of false positives from the candidate classifiers.

In another exemplary aspect, the method further comprises determining that a classifier corresponds to the hash when the hash has the same value as a hash for each file from the plurality of teaching files.

In another exemplary aspect, selecting a classifier comprises: generating a set of candidate classifiers corresponding to the hash, verifying a quality of operation of the candidate classifiers to generate corresponding coefficient of false positives, selecting a classifier with a coefficient of false positives that matches a predetermined criteria as the classifier to use for categorization.

In one exemplary aspect, an exemplary system for detecting malicious files using two-stage file classification is provided. The system may comprise a hardware processor configured to select a set of attributes of a file under analysis, calculate a hash of the file based on the selected set of attributes, select a classifier for the file from a set of classifiers based on the calculated hash of the file, assign the file under analysis to the one or more categories based on the selected classifier, determine whether the file has been assigned to a category of malicious files and conclude that the file is malicious based on the determination.

In another exemplary aspect, an exemplary non-transitory computer-readable medium stores instruction therein for detecting malicious programs using two-stage classification of files. In one aspect, the instructions comprise selecting, by a hardware processor, a set of attributes of a file under analysis, calculating, by the hardware processor, a hash of the file based on the selected set of attributes, selecting, by the hardware processor, a classifier for the file from a set of classifiers based on the calculated hash of the file, assigning, by the hardware processor, the file under analysis to the one or more categories based on the selected classifier, determining whether the file has been assigned to a category of malicious files and concluding that the file is malicious based on the determination.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for detecting malicious files using two-stage file classification. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used throughout the disclosure and drawings.

A malicious application is an application able to cause harm to a computing device or to the data of a user of the computing device (in other words, a computer system: a personal computer, server, mobile telephone, to and so on), for example, an Internet worm, a key logger, or a computer virus. The harm caused may be unlawful access to the computer resources, including the data being kept on the computer, for the purpose of theft, and also unlawful use of the resources, including for data storage, performance of calculations, and so on.

A trusted application is an application which does not cause harm to the computer or its user. A trusted application can be an application developed by a trusted software manufacturer, downloaded from a trusted source (such as a site listed in a database of trusted sites) or an application whose identifier (or other data by which the application can be uniquely determined) (such as the hash sum of the application file) is kept in a database of trusted applications. The manufacturer's identifier, such as a digital certificate, may also be kept in the database of trusted applications.

An untrusted application is an application which is not trusted, but also not recognized as being malicious, for example, by means of an antivirus application. Furthermore, an untrusted application may afterwards be recognized as being malicious, for example, with the aid of an antivirus scan.

A malicious file is a file which is a component of a malicious application and which contains program code (executable or interpretable code).

An untrusted file is a file which is a component of an untrusted application and which contains program code (executable or interpretable code).

A trusted file is a file which is a component of a trusted application.

The predetermined categories of applications are at least the category of trusted applications, the category of untrusted applications, and the category of malicious applications.

A flexible hash ("similarity preserving hash", in particular aspects, a "locality sensitive hash") is a hash of a file which can be calculated on the basis of data stored in the file, and whose value remains unchanged under partial changing of such data. See "Sparse similarity-preserving hashing", Jonathan Masci et al., https://arxiv.org/pdf/1312.5479.pdf and "Locality Sensitive Hashing, Ravi Kumar, https://users-.soe.ucsc.edu/~niejiazhong/slides/kumar.pdf". In one sample aspect of the disclosure, such data stored in the file are simple attributes. In one exemplary aspect, a flexible hash is a hash which will have an identical value for two similar files (the values of the flexible hashes, calculated on the basis of the attributes of the files, match up). By the flexible hash of a group of files (the flexible hash corresponding to a group of files) shall be meant a flexible hash whose value is the same for each file of the mentioned group. Files with a matching value of the flexible hash, especially the files of such a group, may be considered to be similar with a certain accuracy (accuracy in the present context may be understood as being the mean or root mean square value of the degree of similarity, for example between every two files of that group), which is determined by the accuracy of the method of calculating the flexible hash itself.

A simple file attribute is a file attribute (data describing the file in some way) whose identification does not consume significant computing expenses (such attributes may generally be picked out from a file in the original form, without performing additional computations using the data picked out), wherein significance may be determined by computing expense as compared to a threshold value. Examples of simple attributes are the attributes of the header of an executable file, identifiers (such as the names) of objects which are described in the header of an executable file, the size of those objects and the order of their succession in the executable file (the first to come will be objects with the smallest addresses in the file). Objects described in the header of an executable file refers to at least the sections of the file, including the resources of the file, import and export tables, and the address settings. In a particular aspect, the objects which are described in the header of an executable file also mean analogous objects, but which are in the image of the executable file which is generated in the RAM upon launching the executable file.

A complex file attribute is a file attribute (data describing the file in some way) whose identification consumes significant computing expenses, greater than a predetermined threshold value for example. Examples of complex attributes are:

statistical information on the sections of the file: the entropy and distribution of the byte values;
fragments of executable code of a file;
string constants.

The significant computing expenses consumed to identify a file attribute are at least: the allocation of a memory region larger than a threshold value in order to identify the attribute, also the performance of the operation of identifying the file attribute in a time greater than a threshold value, and also an increased volume of file data needed for reading from a data storage device in order identify the file attribute beyond an established threshold.

Two files shall be considered to be similar if the degree of similarity between them exceeds a predetermined threshold (for example, it exceeds 85%, in other words, it exceeds than 0.85). The degree of similarity may be calculated with the aid of any of the known methods, such as those based on computing the metrics of: Jacquard, Dice, Levenshtein, Hemming, and others.

Figure 5:
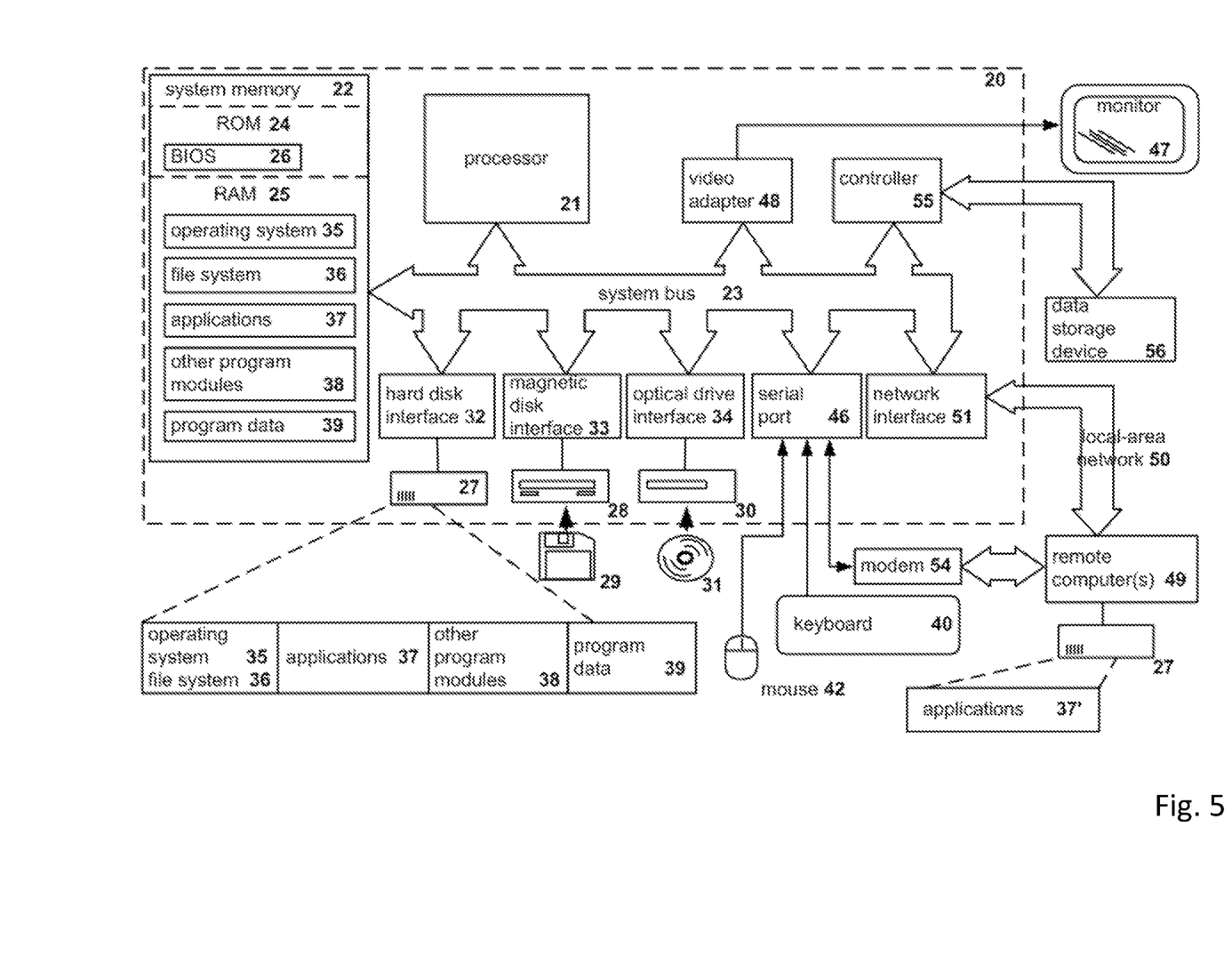
FIG. 5 illustrates an exemplary diagram of a general-purpose computer system, in accordance with exemplary aspects of the present disclosure.

The system for two-stage file classification in the present disclosure comprises components which may be actual devices, systems, elements, groups of elements realized with the use of hardware, such as integrated microcircuits (application-specific integrated circuit, ASIC) or programmable gate arrays (field-programmable gate array, FPGA) or, for example, in the form of a combination of software and hardware, such as a microprocessor system and a set of software instructions, as well as neuromorphic chips (neurosynaptic chips). The functionality of such components of the system can be realized exclusively by hardware, and also in the form of a combination, where some of the functionality of the components of the system is realized by software, and some by hardware. In some exemplary aspects, some of the components or all of the components may be implemented on the processor of a general-purpose computer system (such as is shown in FIG. 5). Furthermore, the system components may be realized in the confines of a single computing device or distributed among several interconnected computing devices.

Figure 1:
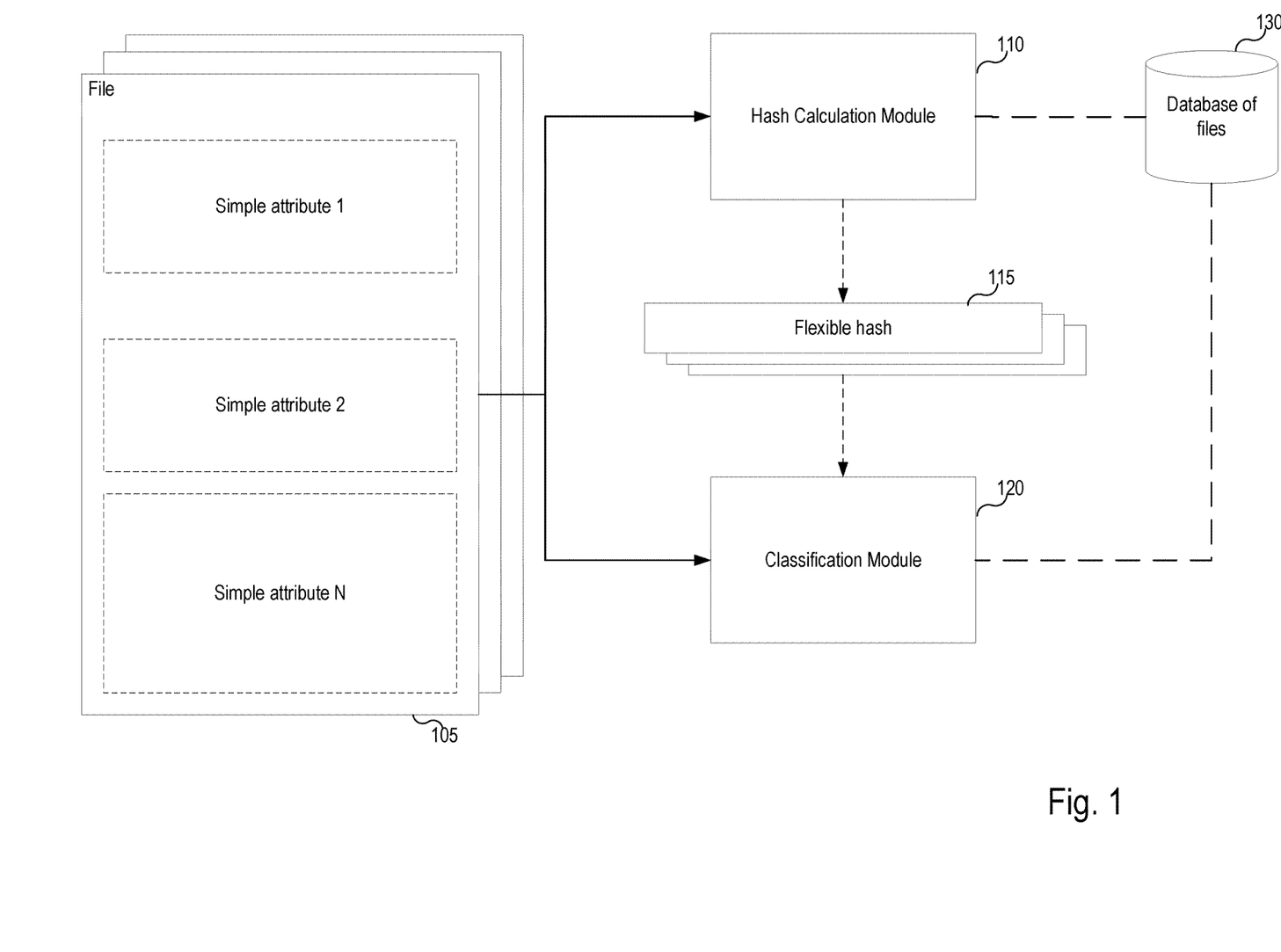
FIG. 1 illustrates an exemplary diagram of the components of a system for detecting malicious files using two-stage file classification, in accordance with exemplary aspects of the present disclosure.

FIG. 1 presents an exemplary diagram of the components of a system for detecting malicious files using two-stage file classification. The present system includes the following components: a hash calculation module 110, a classification module 120 and a database of files 130. In one exemplary aspect of the disclosure, the hash calculation module 110 and the classification module 120 are situated on the same computing device. In another exemplary aspect, the hash calculation module 110 is situated on a client computing device (such as the personal computer of a user), while the classification module 120 is situated on a server computing device. The database of files 130 in this case may be situated on the server device or on the client computing device.

The hash calculation module 110 is designed to pick out from a file a set of simple attributes, and also calculate the flexible hash of the file based on the identified set of simple attributes. Various methods exist for calculating the flexible hash such that the value of such a hash matches up for two similar files, such as "lsh" ("locality sensitive hashing"), as well as other hash functions generated with the aid of supervised learning or partial supervised learning with the condition of satisfying the "similarity preserving" condition—the stability of the hash value to a change in the data used to calculate the hash. The case of a concurrence of the hash value for two files—collision—will mean that these files are similar. One of the examples of calculating such a hash is described in the publication RU2013129552 (where the concept of a hash is replaced by a convolution).

In order to create the flexible hash 115, the hash calculation module 110 picks out from the file 105 a set of simple attributes. In one exemplary aspect of the disclosure, the hash calculation module 110 supplements said set of attributes with complex attributes for one section of the file 105.

The set of attributes of the file 105 picked out by the above method is used by the hash calculation module 110 to calculate the flexible hash 115.

In one exemplary aspect of the disclosure, the following method is used to calculate the flexible hash 115: the flexible hash is formed as a concatenation of the representation (such as the byte representation) of the attributes from the identified set of attributes of the file 105. In one exemplary aspect, the representation of each complex attribute of the file 105 making up said set of attributes first undergoes a processing with the aid of a hash function before being included in the flexible hash. In one exemplary aspect, such a hash function is a hash function satisfying the "similarity preserving" condition, for example, a locality sensitive hash or semi-supervised hash. It should be noted that the technique of calculating a flexible hash ensures a concurrence of the values of the hashes 115 for two similar files in which certain attributes from the identified set of attributes (such as two out of the entire set) are different.

The calculated flexible hash 115 of the file 105 is sent by the hash calculation module 110 to the classification module 120.

According to one aspect, the classification module 120 may assign the file 105 to one of the categories of files. In one exemplary aspect, such a category is a certain predetermined category, such as: the category of trusted files, the category of malicious files, or the category of untrusted files. In one exemplary aspect of the disclosure, yet another category of files might be the category to which the file 105 is assigned if it has not been assigned to any of the predetermined categories (such as the category of "unknown files"). In order to assign the file 105 to a certain category, the classification module 120 uses a classifier. By classifier we shall mean a classifying model (in other words, a classification algorithm). Examples of such classifiers may be the following classifying models (types of classifiers):
- a decision tree;
- "gradient boosting";
- "random forest";
- models based on neural nets.

Accordingly, the classification module 120 also makes a choice of the classifier which will afterwards be used to assign the file 105 to one of the categories of files. In one exemplary aspect of the disclosure, the choice of the classifier is made on the basis of the flexible hash 115 of the file 105. In this case, each classifier is tied to at least one value of the flexible hash. In one exemplary aspect of the disclosure, all classifying models accessible for use by the classification module 120 are stored in the classification module 120, for example in a database designed for this purpose.

Figure 2:
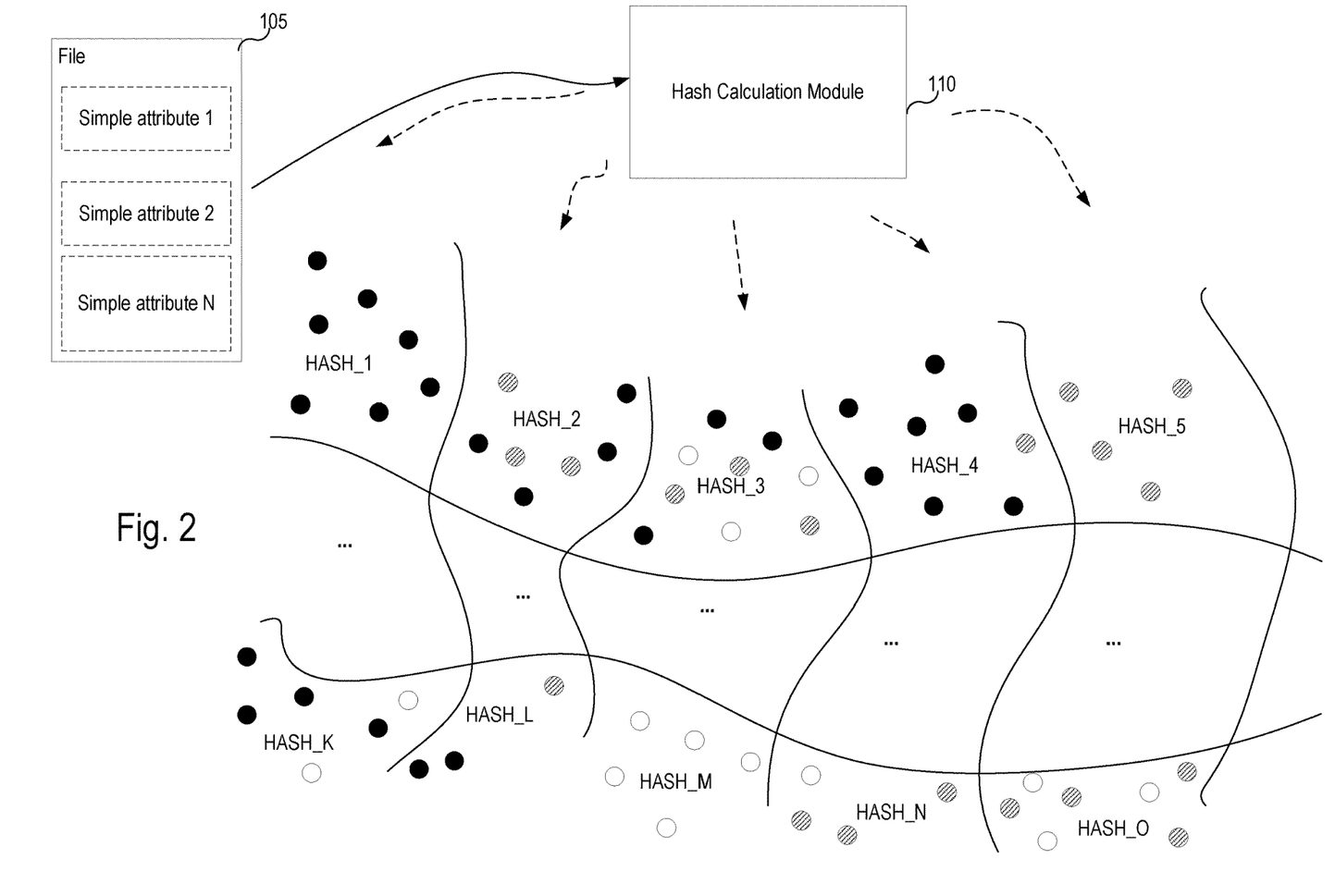
FIG. 2 illustrates an example of the computing of the flexible hash of a file, in accordance with exemplary aspects of the present disclosure.

FIG. 2 illustrates a diagram of the operation of the hash calculation module 110 that calculates the flexible hash for the file 105. It should be noted that the step of calculating the flexible hash 115 by the hash calculation module 110 is preceded by a step of teaching the hash calculation module 110 (this step is not shown in the figures).

The hash calculation module 110 is taught so that the value of the flexible hash calculated for two similar files, specifically two sets of attributes of these files, matches up. For this, the method of supervised teaching may be used. The step of teaching the hash calculation module 110 uses a purpose-built collection of files for the teaching from the database of files 130 (from which sets of attributes are picked out), said collection containing not only files, but also information in regard to the similarity of the files to each other (the degree of similarity of the files to each other). In one exemplary aspect, the relationship of similarity of the files is the degree of similarity of the files. In another exemplary aspect, the relationship of similarity of the files is an indication of whether the files are similar: "files similar" or "files not similar". In one exemplary aspect of the disclosure, said database 130 also contains information on the categories (the category of trusted, malicious or untrusted files) to which the files from the aforementioned collection of files are assigned. Such information may also be used in the step of teaching to reduce the number of errors of the first and second kind when calculating the flexible hash 115 by the hash calculation module 110. This is also done to decrease the probability of calculating the identical value of the flexible hash 115 for two files, one of which is assigned for example to the category of trusted files, and the other to the category of malicious files. In one exemplary aspect of the disclosure, the information stored in the mentioned database of files 130 is placed there by specialists in the field of information technology.

When calculating the flexible hash, the hash calculation module 110 picks out a set of attributes containing at least simple attributes from the file 105, these attributes being conditionally designated as "simple attribute 1", "simple attribute 2", and so forth. In the given example, it is not known whether the file 105 is malicious or trusted, or to which categories of files the file belongs. The hash calculation module 110 taught by one of the methods calculates the flexible hash 115 of the file 105 on the basis of its attributes.

FIG. 2 designates files whose categories are known by circular markers. Such files and the categorical information may be stored in the database of files 130. The black markers designate files belonging to the first category, the white markers designate files belonging to the second category, and the partially shaded (e.g., grey) markers designate files belonging to the third category. In a particular aspect, such categories are predetermined file categories. As an example, the first file category is the category of malicious files, the second file category is the category of trusted files, and the third file category is the category of untrusted files. It should be noted that the collection of said files matches up with the collection of files used for the teaching of the hash calculation module 110. But in another exemplary aspect of the disclosure, the collection of said files (the files indicated by markers in FIG. 2) may differ from the collection of files used for the teaching of the hash calculation module 110, for example, such a collection might be supplemented with new files (yet the belonging of these files to certain categories is also known), and these supplemental files may be added, for example, to the database of files 130 by a specialist in the field of information technology.

The mentioned files (which correspond to the markers in FIG. 2) are first broken down by the hash calculation module 110 into groups of files by calculating the flexible hash. Each group of files corresponds to a particular value of the flexible hash (HASH_1, HASH_2 and so on), calculated for a file of this group, that is, the group will contain files with a matching value of the flexible hash. For example, for each file of the group conditionally designated as HASH_1 the flexible hash calculated on the basis of the set of file attributes by the hash calculation module 110 will have a value which shall be denoted as HASH_1. It should be noted that the hash calculation module 110 might very well place files from different categories in the same group (by calculating flexible hashes with a matching value for those files). Accordingly, each of the groups corresponding to a certain value of the flexible hash may contain both files of only one category (for example, the category of malicious files, as in group HASH_1) and those of several categories (for example, the category of malicious files and untrusted files, as in group HASH_2, HASH_4 or HASH_L).

Thus, the calculation of the flexible hash for the file 105 by the hash calculation module 110 might be called the assigning of the file 105 to a certain group of files with a matching value of the flexible hash (groups HASH_1, HASH_2, HASH_3 and so forth).

The value of the flexible hash 115 (being the identifier of the group to which the file 105 is assigned) for the file 105 is sent by the hash calculation module 110 to the classification module 120.

Figure 3:
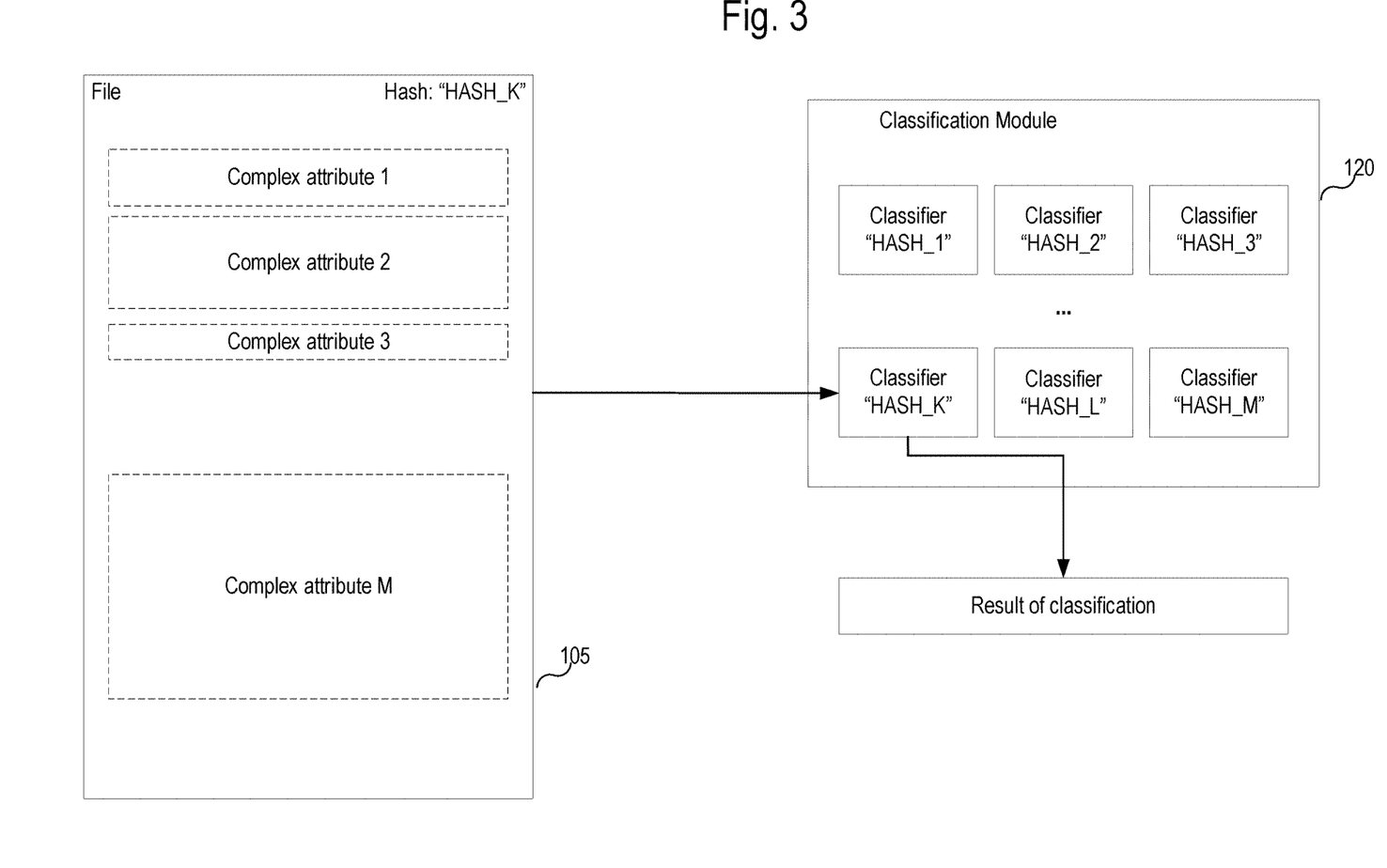
FIG. 3 illustrates an example of the classification of files, in accordance with exemplary aspects of the present disclosure.

FIG. 3 shows an example of the operation of the classification module 120. In order to assign the file 105 to one of the file categories, such as one of the predetermined categories, the classification module 120 selects a classifier for the file 105 that corresponds to the flexible hash 115 of the file 105. In one exemplary aspect, the correspondence of the classifier to a particular flexible hash is determined as follows: if a group of files from the database of files 130 was used for the teaching of the classifier and the value of the flexible hash matches up for the files from this group, then the classifier corresponds to this flexible hash. For example, if the group of files HASH_3 (see FIG. 2) was used for the teaching of the classifier, then that classifier will correspond to the flexible hash HASH_3 (and, accordingly, is denoted as "classifier HASH_3").

In order for the classification module 120 to be able to select a classifier for the file 105, the classification module 120 at first generates a set of such classifiers, from which afterwards the set of candidate classifiers will be chosen that is needed to categorize the file 105. The following method is used to generate the classifier corresponding to a certain known flexible hash (i.e., a flexible hash whose value is identical for files known to belong to a certain file category, such as the category of malicious files or the categories of malicious and trusted files), such as the hash HASH_4. Files from a group of files, such as the one designated as HASH_4, are used as a teaching selection for the supervised teaching of different types of classifying models, examples of such classifying models having been given above. During the teaching step, information is used as to the belonging of the files of the given group, particularly HASH_4, to the different categories of files (especially malicious, trusted or untrusted). It should be noted that the teaching of any of the classifiers by the classification module 120 is done not only on files from a certain teaching selection, but also on the basis of the set of attributes of these files, each such set consisting of at least complex file attributes.

After the teaching, the candidate classifiers (where each of the classifiers is a candidate to be the classifier corresponding to a certain flexible hash, in particular the flexible hash HASH_4) undergo a verification step (particularly a verification of the quality of operation of the classifier). In the verification step it is possible to use a selection of files with a large number of files (the selection of files for verification) not just the files from the group HASH_4 (for our example). The task of the verification step is to select a classifier from those previously taught as the one corresponding to a certain value of flexible hash, especially HASH_4. For each of the files used in the verification step, it is likewise known whether that file belongs to one of the file categories. As a result of the verification, all the files used for the verification are categorized by each of the candidate classifiers. Using previously known information about the affiliation of the files with categories of files from the selection for the verification of each candidate classifier for the role of the classifier corresponding to a certain flexible hash (and consequently to the group of files with a matching hash value), the coefficient of false positives is calculated. The classifier with the smallest coefficient of false positives is chosen as the classifier corresponding to the particular flexible hash.

The coefficient of false positives is a number, for example between 0 and 1, which is larger when there are more errors of the first and/or second kind committed during the verification step of a classifier. In one exemplary aspect, the coefficient of false positives is calculated by the following formula:

$$F = \frac{FP}{N_c};$$

where: FP (False Positive) is the number of false positives, which are wrong assignments of files to a certain category (for example, if it is known for a file from the selection for verification that it belongs to the category of trusted files, but the classifier wrongly assigned this file to the category of malicious files), Nc is the total number of files in this "particular" category (for the example given above, Nc is the number of files in the category of trusted files), and F is the coefficient of false positives.

In another exemplary aspect, any other formula may be used, whereby the coefficient of false positives F increases with increasing number of false positives FP.

In yet another exemplary aspect, the classifier corresponding to a certain flexible hash is chosen to be the classifier with the smallest coefficient of false positives and which did not have any false positives on a selected set of files. This set of files may contain files not making up the group of files with a matching hash value for which the corresponding classifier is chosen. In a particular aspect, such files are trusted files created by trusted software developers. A list of trusted developers may be stored in the classification module 120, or outside of it on a remote server, and be updated by a specialist in the field of information technologies. In a particular aspect of the disclosure, trusted software developers are the companies Microsoft, Google, McAfee, Intel, Kaspersky Lab and others.

In another exemplary aspect, the classifier corresponding to a certain flexible hash is chosen to be the classifier whose coefficient of false positives is not higher than a certain threshold value, such as 10−5, and which has the highest coefficient of detection. The coefficient of detection is calculated by the following formula:

$$D = \frac{TP}{N},$$

where TP is the number of correct assignments of the files from the selection for verification to the corresponding categories.

In yet another exemplary aspect, when the file categories are at least the category of trusted and malicious files, the coefficient of detection is calculated by the following formula:

$$D = \frac{TP}{N_p},$$

where TP is the number of files in the selection of files for verification from the category of malicious files that were correctly assigned to the category of malicious files, and NP is the number of files in the selection of files for verification from the category of malicious files.

It should be noted that if none of the candidate classifiers meets the conditions for selection of a classifier, for example if the coefficients of false positives of all the candidate classifiers are higher than a given threshold, then the classification module 120 does not associate any classifier with the particular flexible hash.

The aforementioned step of verification and designation of a classifier is performed by the classification module 120 for each of the known flexible hashes and, accordingly, also for each known group of files. A known flexible hash is a flexible hash which has been calculated on the basis of a file (specifically, on the basis of a set of attributes of a file) whose affiliation with a particular category is known. A known group of files is a group of files with an identical value to a known flexible hash. The files used by the classification module 120 in the step of generating the set of classifiers, and also the files used for the verification of the classifiers, may be stored in the database of files 130. It should be noted that two values of flexible hashes, such as HASH_3 and HASH_L, may be associated with classifiers of the same type, yet taught on different selections of files, for example, the classifier HASH_3 is taught on a selection of files consisting of a group of files with a value matching that of the flexible hash HASH_3, while the classifier HASH_L is taught on a selection of files consisting of the group of files with a value matching that of the flexible hash HASH_L.

The classifier chosen by the classification module 120 on the basis of the flexible hash 115 is applied to the set of attributes consisting of complex attributes. This set of attributes is picked out from the file 105 by the classification module 120 and sent to the classifier corresponding to the flexible hash 115 of the file 105. On the basis of this set of attributes, the previously taught classifier assigns the file 105 to one of the predetermined file categories.

In one exemplary aspect of the disclosure, if the flexible hash 115 of the file 105 corresponds to a classifier which has been taught on a selection of files containing a group of files with an identical value of the flexible hash, such that all files from the given group are assigned to one particular category (let us say "category X" or the category of malicious files), then the classification module 120 will assign the file 105 to this category without using the classifier corresponding to that group. Such an approach when categorizing a certain collection of files decreases the time spent on determining the category of each file, since the determination of the category of certain files will be done without the use of the classifier and the picking out of complex attributes from the file 105, and hence more rapidly. The coefficient of detection during such a categorization will not be less than in the situation when each file would undergo categorization with the use of the classifier.

In the event that the file 105 is assigned to the category of malicious files, the file 105 is recognized as malicious by the classification module 120. In the event that the file 105 is assigned to the category of trusted files, the file 105 is recognized as trusted by the classification module 120.

Figure 4:
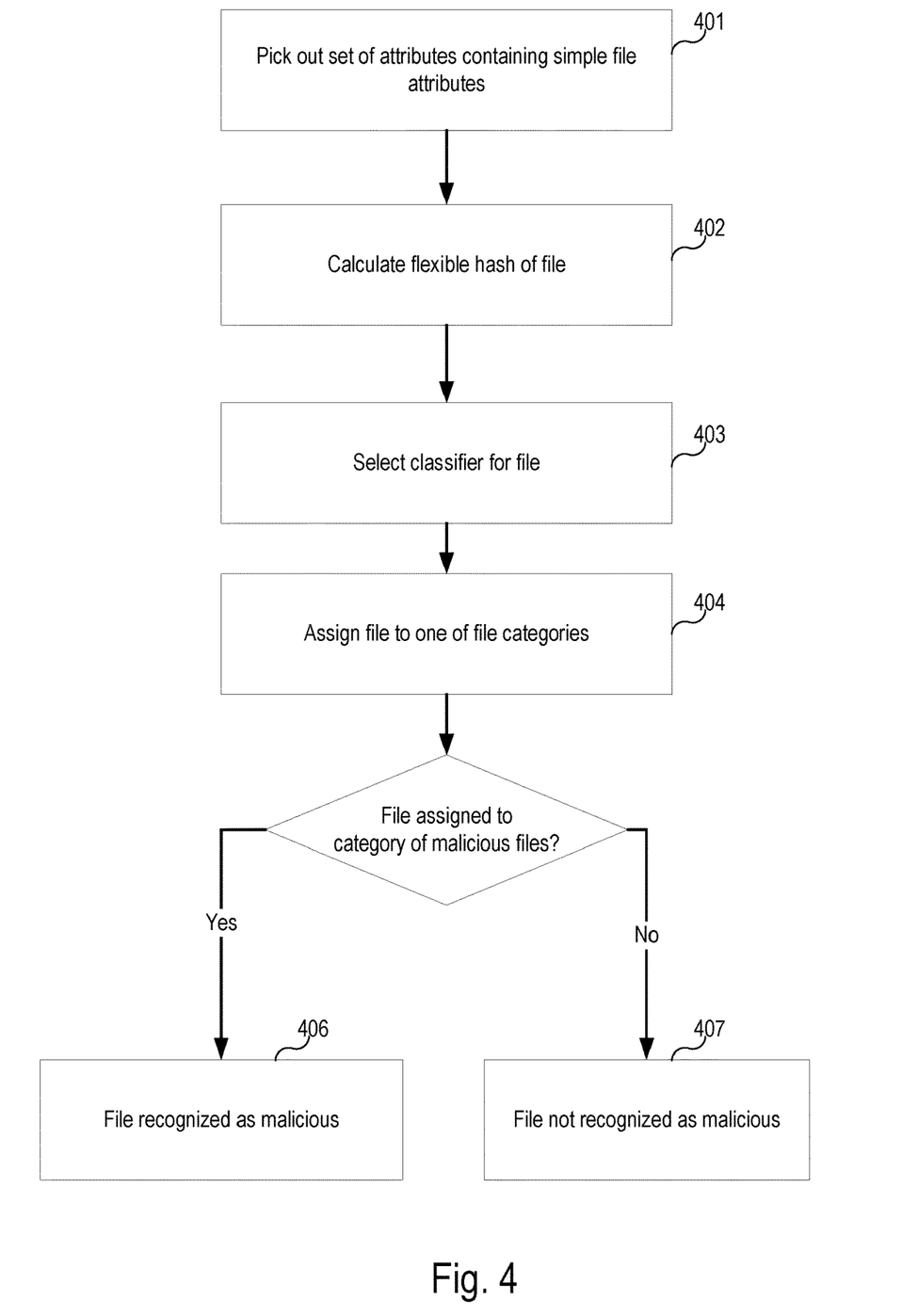
FIG. 4 illustrates an exemplary method for detecting malicious files using two-stage file classification, in accordance with exemplary aspects of the present disclosure.

FIG. 4 shows an example of the method for detecting malicious files using two-stage file classification. In step 401 the hash calculation module 110 selects from the file 105 a set of attributes which contains at least simple attributes of the file 105. The file 105 in this case is a file whose belonging to a certain category needs to be determined. After this, in step 402 the hash calculation module 110 calculates the flexible hash 115 of the file 105 on the basis of the set of attributes picked out. The calculated flexible hash 115 is then used by the classification module 120 to select a classifier corresponding to the flexible hash 115 in step 403. In one exemplary aspect of the disclosure, to each classifier (previously taught) the classification module 120 assigns at least one value of the flexible hash characterizing the group of files (i.e. the files from the group whose flexible hash value matches up) that are included in the teaching selection for that classifier. Using the chosen classifier, the classification module 120 performs the categorization of the file 105—the classification module 120 will assign the file 105 to one of the file categories in step 404 (in particular, to one of the categories where the files were assigned from the selection used for the teaching of the corresponding classifier used by the classification module 120). If the file 105 is assigned to the category of malicious files, then in step 406 the file 105 is recognized as malicious by the classification module 120. Otherwise, the file 105 in step 407 is not recognized as malicious.

The present method of two-stage classification of files has the following advantage over methods based on the use of a single classifier to determine the category of files. The use of a collection of classifiers corresponding to flexible hashes makes it possible to achieve a smaller number of mistakes of the first and second kind when categorizing a collection of unknown files (whose categories are unknown), since a classifier (implemented accordingly) is determined for each group of files, in particular a group of files with a matching value of flexible hash that has, for example, the smallest coefficient of false positives and/or the largest coefficient of detection. Thus, the use of the present method in the context of the proposed disclosure makes it possible to achieve the technical result—increasing the quality (lowering the number of mistakes of the first and second kind) of the categorization of files, and in particular lowering the number of mistakes of the first and second kind during the detection of malicious files.

FIG. 5 is a block diagram illustrating a general-purpose computer system 20 on which aspects of the present disclosure may be implemented in accordance with an exemplary aspect. It should be noted that the computer system 20 can correspond to the system 100, and/or individual components thereof.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. . . . . Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and the networks generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for detecting malicious files comprising:
   selecting a plurality of teaching files for supervised teaching of a classifying model to generate a plurality of candidate classifiers, wherein the plurality of teaching files corresponds to a known flexible hash in a set of classifiers, and there is a known flexible hash for each of one or more categories, wherein the one or more categories comprise malicious files, trusted files and untrusted files;
   verifying each of the plurality of candidate classifiers by classifying a plurality of verification files, including at least the plurality of teaching files;
   selecting a classifier from the plurality of candidate classifiers, wherein the selected classifier resulted in the least false categorizations of the plurality of verification files; and
   assigning the classifier to the known flexible hash, for each of the one or more categories;
   selecting a set of attributes of a file under malware analysis;
   calculating a hash of the file based on the selected set of attributes;
   selecting a classifier for the file from the set of classifiers based on the calculated hash of the file;
   assigning the file under analysis to the one or more categories based on the selected classifier;
   determining whether the file has been assigned to a category of malicious files; and
   concluding that the file is malicious based on the determination of whether the file has been assigned to the category of malicious files.

2. The method of claim 1, wherein the set of attributes are simple attributes whose identification does not consume computing expenses greater than a predetermined threshold, or both simple attributes and complex attributes whose computing expenses exceed the predetermined threshold.

3. The method of claim 1, wherein the simple attributes comprise attributes of a header of the file, identifies of objects described in the header, size of the objects, and the order of the objects in the file.

4. The method of claim 1, wherein the hash is the flexible hash having a similar value for two similar files, wherein files are considered similar when the degree of similarity is greater than a predetermined threshold value.

5. The method of claim 1, further comprising:
assigning a hash value for each classifier in the set of classifiers, prior to selecting the classifier.

6. The method of claim 1, further comprising:
calculating a coefficient of false positives based on known categorizations of the plurality of verification files to aid in the selecting of the classifier.

7. The method of claim 6, further comprising:
selecting the classifier with the smallest coefficient of false positives from the plurality of candidate classifiers.

8. The method of claim 1, further comprising:
determining that a classifier corresponds to the hash when the hash has the same value as a hash for each file from the plurality of teaching files.

9. The method of claim 1, wherein selecting a classifier comprises:
generating a set of candidate classifiers corresponding to the hash;
verifying a quality of operation of the set of candidate classifiers to generate corresponding coefficient of false positives;
selecting a classifier with a coefficient of false positives that matches a predetermined criteria as the classifier to use for categorization.

10. A system for detecting malicious files comprising:
a hardware processor configured to:
select a plurality of teaching files for supervised teaching of a classifying model to generate a plurality of candidate classifiers, wherein the plurality of teaching files corresponds to a known flexible hash in a set of classifiers, and there is a known flexible hash for each of one or more categories, wherein the one or more categories comprise malicious files, trusted files and untrusted files;
verify each of the plurality of candidate classifiers by classifying a plurality of verification files, including at least the plurality of teaching files;
select a classifier from the plurality of candidate classifiers, wherein the selected classifier resulted in the least false categorizations of the plurality of verification files;
assign the classifier to the known flexible hash, for each of the one or more categories;
select a set of attributes of a file under malware analysis;
calculate a hash of the file based on the selected set of attributes;
select a classifier for the file from the set of classifiers based on the calculated hash of the file;
assign the file under analysis to the one or more categories based on the selected classifier;
determine whether the file has been assigned to a category of malicious files; and
conclude that the file is malicious based on the determination of whether the file has been assigned to the category of malicious files.

11. The system of claim 10, wherein the set of attributes are simple attributes whose identification does not consume computing expenses greater than a predetermined threshold, or both simple attributes and complex attributes whose computing expenses exceed the predetermined threshold.

12. The system of claim 10, wherein the simple attributes comprise attributes of a header of the file, identifies of objects described in the header, size of the objects, and the order of the objects in the file.

13. The system of claim 10, wherein the hash is the flexible hash having a similar value for two similar files, wherein files are considered similar when the degree of similarity is greater than a predetermined threshold value.

14. The system of claim 10, the hardware processor further configured to:
select the classifier with the smallest coefficient of false positives from the plurality of candidate classifiers.

15. The system of claim 14, wherein selecting a classifier comprises:
generating a set of candidate classifiers corresponding to the hash;
verifying a quality of operation of the set of candidate classifiers to generate corresponding coefficient of false positives;
selecting a classifier with a coefficient of false positives that matches a predetermined criteria as the classifier to use for categorization.

16. A non-transitory computer-readable medium, storing instructions thereon for detecting malicious files, the instructions comprising:
selecting a plurality of teaching files for supervised teaching of a classifying model to generate a plurality of candidate classifiers, wherein the plurality of teaching files corresponds to a known flexible hash in a set of classifiers, and there is a known flexible hash for each of one or more categories, wherein the one or more categories comprise malicious files, trusted files and untrusted files;
verifying each of the plurality of candidate classifiers by classifying a plurality of verification files, including at least the plurality of teaching files;
selecting a classifier from the plurality of candidate classifiers, wherein the selected classifier resulted in the least false categorizations of the plurality of verification files; and
assigning the classifier to the known flexible hash, for each of the one or more categories;
selecting a set of attributes of a file under malware analysis;
calculating a hash of the file based on the selected set of attributes;
selecting a classifier for the file from the set of classifiers based on the calculated hash of the file;
assigning the file under analysis to the one or more categories based on the selected classifier;
determining whether the file has been assigned to a category of malicious files; and
concluding that the file is malicious based on the determination of whether the file has been assigned to the category of malicious files.

17. The medium of claim 16, wherein the instructions further comprise:
selecting the classifier with the smallest coefficient of false positives from the plurality of candidate classifiers.

18. The medium of claim 17, wherein the instructions comprise selecting a classifier by:
generating a set of candidate classifiers corresponding to the hash;
verifying a quality of operation of the set of candidate classifiers to generate corresponding coefficient of false positives;

selecting a classifier with a coefficient of false positives that matches a predetermined criteria as the classifier to use for categorization.

\* \* \* \* \*